INVENTOR
Edgar Kuhn

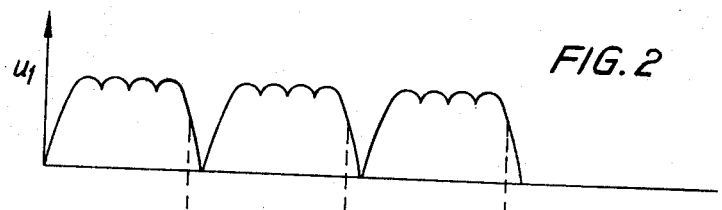
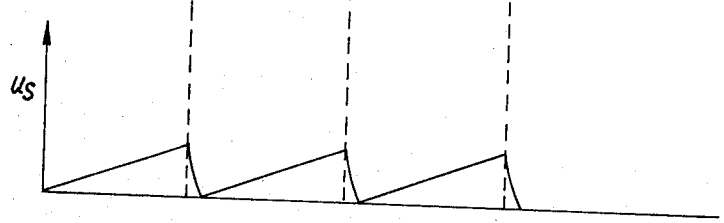
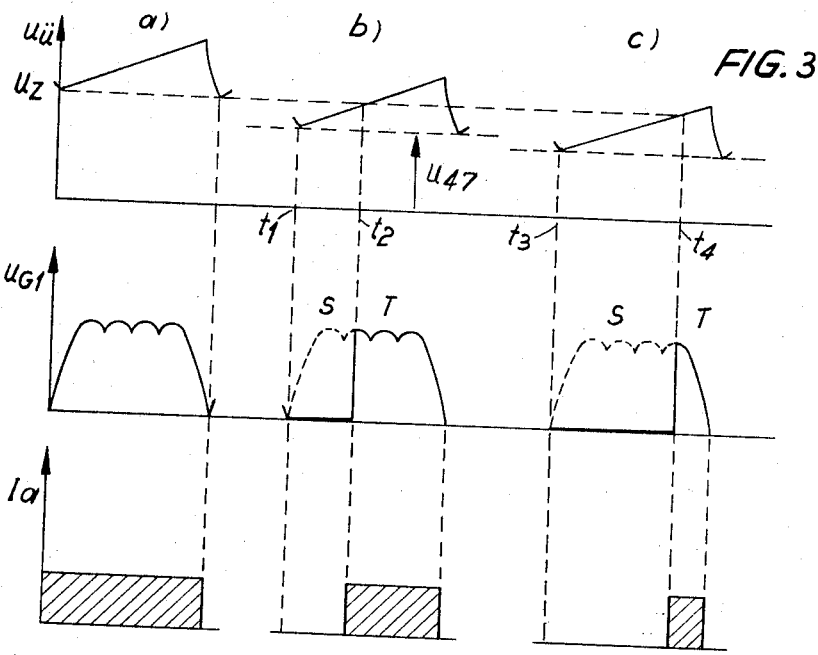

United States Patent Office 3,447,065
Patented May 27, 1969

3,447,065
VOLTAGE REGULATOR FOR A MULTIPHASE VARIABLE-SPEED, VARIABLE-FREQUENCY GENERATOR FOR AUTOMOTIVE USE
Edgar Kuhn, Gerlingen, Germany, assignor to Robert Bosch GmbH, Stuttgart, Germany, a limited-liability company of Germany
Filed Jan. 20, 1967, Ser. No. 610,540
Claims priority, application Germany, Feb. 12, 1966, B 85,790
Int. Cl. H02h 7/06; H02p 9/00, 9/26
U.S. Cl. 322—24                                 18 Claims

ABSTRACT OF THE DISCLOSURE

A saw-tooth wave generator (52, 53, 54) provides a saw-tooth wave, in synchronism with the frequency of the generator (10); these saw-tooth waves are added to an error signal proportional to the deviation of output potential of the generator from a desired value; the firing point of controlled rectifiers, during each half-wave, supplying the generator field is adjusted in accordance with the relationship of the combined error signal and saw-tooth wave with respect to a reference, by determining the coincidence of the reference as the combined error signal—saw-tooth wave increases during each cycle of the generator.

---

The present invention relates to a voltage regulator for a multiphase generator, and more particularly to a voltage regulator for a three-phase alternator for automotive use, where both the frequency and speed of operation of the three-phase alternator varies widely.

It is known to control the output potential of multiphase generators, particularly three-phase generators by utilizing controlled rectifiers, such as silicon-controlled rectifiers (SCR) which are controlled to fire in accordance with a predetermined phase angle with respect to the output potential of the generator. The current derived from the controlled rectifiers is then used to supply the field of the generator with field current. Such known arrangements have the disadvantage that they utilize a substantial number of control elements and it is difficult to control more than a single rectifier therewith. When the frequency, and speed of operation of the generator is substantially constant, as is usually the case for commercial power supplies, it is possible to greatly simplify the control arrangement, even if phase-angle control of SCR's is used. Generators, in which the speed varies widely cannot use such simplified control arrangements.

It is an object of the present invention to provide a voltage regulator for a generator having widely varying drive speeds, and hence frequencies, which is both simple, efficient, and utilizes a minimum of components.

Briefly, in accordance with the present invention, the voltage regulator provides field current for a field winding of a three-phase alternator utilizing a pair of controlled rectifiers, one each connected to a phase, each, of the generator. A comparator is provided connected to the output potential of the generator, and supplying an error signal indicative of the variation of the output potential from a desired norm. A saw-tooth wave generator is connected to receive potential from at least one phase of the generator; it develops a saw-tooth wave in synchronism with the frequency of the generator. An adder circuit adds the saw-tooth wave to the error signal, to provide a wave form sloping gradually and then abruptly returning to the original value; the starting and maximum amplitude thereof is governed by the level of the error signal. A reference voltage is obtained, and upon coincidence of the gradually rising error signal—saw-tooth wave combination with the level of the reference voltage, a firing circuit connected to fire SCR's supplying the field coil, is energized. The phase-angle position of the SCR's is thus determined by the deviation of the output voltage from a norm (as determined by the error signal) as well as by the saw-tooth wave, recurring in synchronism with the frequency of the generator.

To obtain a reference, a Zener diode can be used; the comparator may be a transistor circuit, and the firing and saw-tooth wave circuits likewise can be built up inexpensively of transistors and well-known and readily available electronic components.

The structure, organization and operation of the invention will now be described more specifically in the following detailed description with reference to the accompanying drawings, in which:

FIGURES 2 and 3 are diagrams illustrating the operation of the invention according to FIGURE 1;

Figure 1:
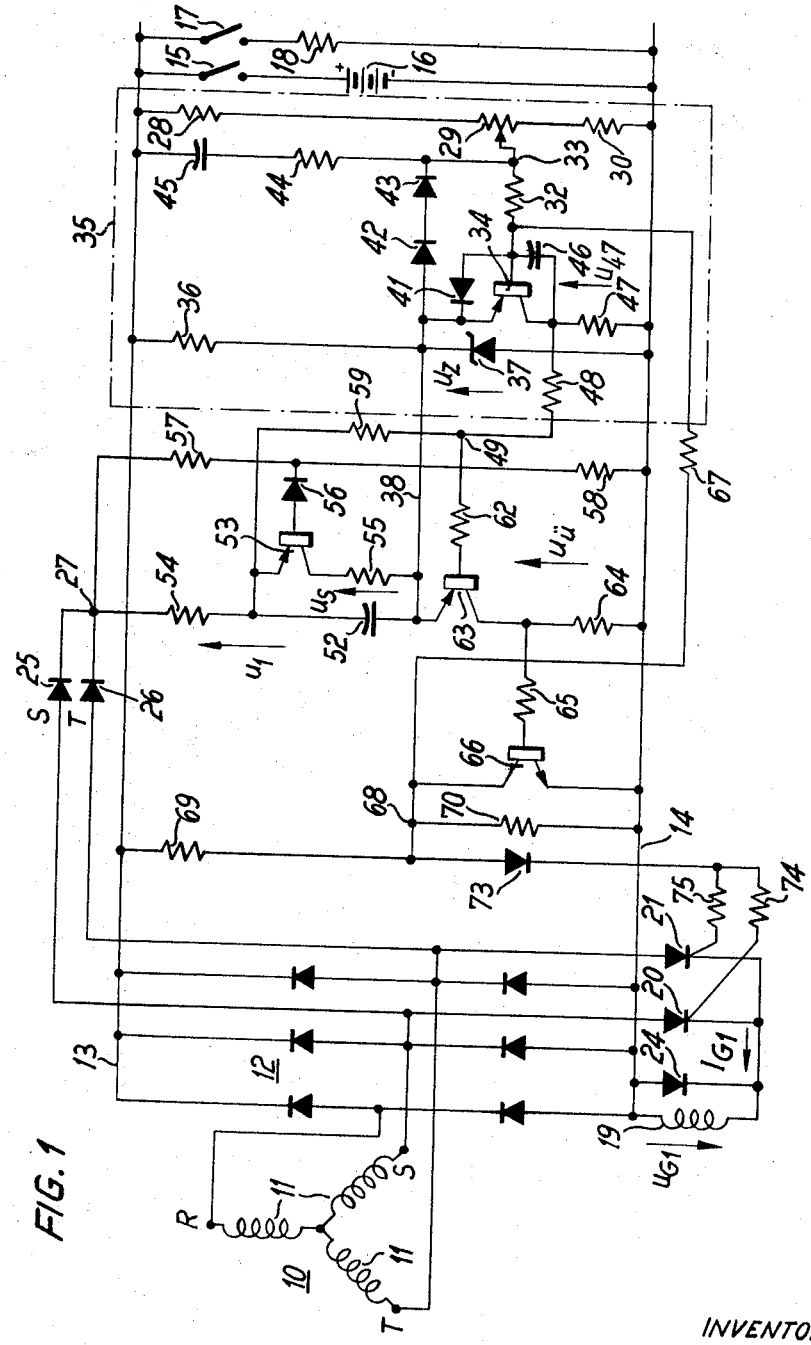
FIGURE 1 is a circuit diagram of a voltage regulator, connected to a three-phase generator having a pair of SCR's to supply the field current for the generator, the firing angle of which is controlled.

Referring now to the drawings and particularly to FIGURE 1: a three-phase alternator 10 has three separate star-connected phase windings 11 (phases R, S, T) connected over a three-phase full-wave rectifier 12 to a positive load bus 13 and a negative bus 14. A switch 15 connects the bus to a battery 16; a switch 17 can connect a load as schematically indicated at 18.

A field coil 19 is connected on the one hand to negative bus 14, and on the other over two silicon controlled rectifiers (SCR) 20, 21 to a pair of the phase windings 11 (phase S and phase T). The cathodes of rectifiers 20, 21 are connected to the field 19 and the anodes to the phase windings. The field 19 has a clipping diode 24 connected in parallel therewith to bypass peaks which arise upon abrupt termination of current through the field.

The phase winding of phase S is connected to the anode of a rectifier 25, and the winding of phase T to the anode of a rectifier 26; their cathodes are interconnected at junction 27. When generator 10 is operating, a potential arises between junction 27 and the minus bus 14 which is shown in the upper diagram of FIGURE 2. A portion in the diagram (FIGURE 3) indicated at S is supplied by the phase winding of phase S and the portion indicated at T (FIGURE 3) is supplied by the phase winding of phase T.

A voltage divider, formed of three resistances 28, 29, 30 is connected between buses 13 and 14. A tap 33 is connected over a resistor 32 to the base of a p-n-p transistor 34, which forms part of a comparator generally indicated within the dash-dotted lines 35, and comparing the output potential of the generator with a desired normal value. The norm, or desired potential of the output, is determined by a Zener diode 37, serially connected with a resistor 36, and likewise connected across buses 13, 14. The potential of the Zener diode may be 8 volts, for example, for a nominal voltage of battery 16 of 12 volts. The potential across Zener diode 37 is indicated in FIGS. 1 and 3 with $u_z$. The cathode of Zener diode 37 is connected to an intermediate positive bus 38, to which the cathode of a protecting diode 41, the anode of a further diode 42, in series with an additional diode 43, is connected. The emitter of transistor 34 is connected to intermediate bus 38. The anode of the protecting diode 41 is interconnected with the base of the transistor 34, the cathode of diode 43 with the tap 33 of the voltage divider on the one hand, and on the other with a resistance 44 and over a condenser 45 to the positive bus 13. A condenser 46 is connected between the base and the collector of transistor 34. Collector resistance 47 connects the collector of transistor 34 with the minus bus 14, and further over an adding resistance 48 with a junction 49. The voltage across resistance 47 is indicated as $u_{47}$ in FIGS. 3 and 6 of the drawings.

Figure 5:
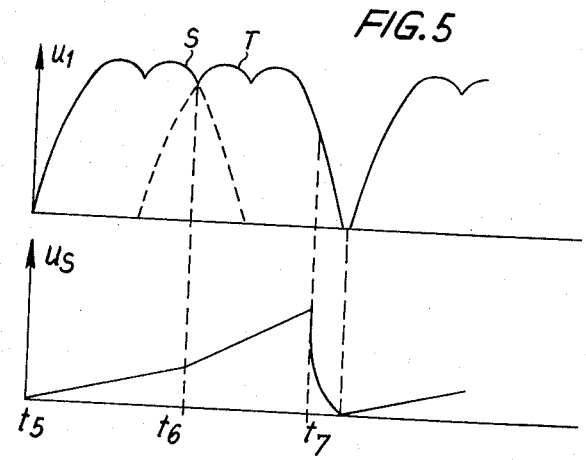
FIGURES 5 and 6 are diagrams to illustrate the operation of the circuit in accordance with FIGURE 4.

A saw-tooth wave generator is connected to the regulator circuit; it generates a sawtooth wave $u_s$ (FIGS. 2 and 5). It includes a condenser 52, having one side connected to the intermediate positive bus 38, and the other to the emitter of a p-n-p transistor 53. A load resistance 54 connects the emitter of transistor 53, and the condenser 52, to junction 27. The collector of transistor 53 is connected over a collector resistance 55, which simultaneously serves as a discharge resistance for condenser 52, to this intermediate positive bus 38. The base of the transistor is connected to the anode of a protective diode 56, the cathode of which connects to a tap between a pair of resistances 57, 58, forming a voltage divider connected on one side to the negative bus 14 and on the other to junction 27. The emitter of transistor 53 is connected over an adding resistance 59 with junction 49.

The junction 49 is connected over a resistance 62 to the base of a p-n-p transistor 63, functioning as an adding network. The emitter of transistor 63 is connected to the intermediate positive bus 38, and its collector over a collector resistance 64 to the negative bus 14 on the one hand and over a coupling resistance 65 to the base of the second transistor 66, functioning as a phase reversal stage. Transistor 66, an n-p-n transistor, has its emitter connected to the negative bus 14; its collector is connected to a negative feedback resistance 67, connected to the base of transistor 34; further, to the tap point 68 of a voltage divider formed of a pair of resistances 69, 70, connected between buses 13, 14. It is to be noted that the emitter-collector path of transistor 66 is in parallel to the resistance 70.

The tap point 68 is further connected over a protective diode 73, and a pair of balancing resistors 74, 75 to the control electrodes of the SCR's, 20, 21.

The operation of the saw-tooth wave generator will be described first. Let it be assumed that the potential between line 13, 14 has the desired value, for example 12 volts. A pulsating potential, $u_1$ indicated in the upper row of FIGURE 2 will appear at junction 27. When this potential rises from 0 to a positive value, a charging current will flow over the load-resistor 54 into condenser 52, to charge the condenser. The potential is indicated in the second row of FIGURE 2 as $u_s$. Transistor 53 is blocked, since its emitter, having the same potential as condenser 52, appled thereto, has a more negative potential than its base which is connected to the tap point of the voltage divider formed by resistors 57, 58.

When the potential $u_1$ has gone through its positive cycle, and is decreasing again, that is when the decreasing branch of the curve T, FIGURE 3, is reached, the base of transistor 53 will eventually become more negative than its emitter, which will retain the higher potential of condenser 52. In this moment, transistor 53 becomes conductive, condenser 52 rapidly discharges through the transistor 53 and resistance 55. When the potential $u_1$ again becomes positive, the next cycle to generate a saw-tooth wave can begin. Discharge of the condenser is aided by the fact that, as the condenser discharges, the potential of the base of the transistor 53 becomes further negative, as $u_1$ decreases. The form of the saw-tooth wave is illustrated in the second row of FIGURE 2. The discharge time of condenser 52 depends on the value of the collector resistance 55, which serves as a discharge resistance. The saw-tooth wave, $u_s$ is applied over the adder resistance 59 to junction 49.

The comparator 35 (FIGURE 1) operates in this manner: Let it again be assumed that the value of the potential on buses 13, 14 is 12 volts, and that the value at tap 33 of voltage divider 28, 29, 30 then is 7.5 v. The Zener diode 37 is chosen to have a normal potential of 8 v.

If the potential between lines 13 and 14 is below the desired value, so that the potential at tap 33 only is 7 volts, then the potential on the base of the transistor 34 is more negative than that of its emitter, determined by the Zener diode and assume to be 8 volts in the example. Transistor 34 is thus fully conductive, and its collector resistance 47 thus has practically the full value of the Zener diode voltage 37, that is 8 volts, thereacross. This potential, indicated at $u_{47}$ is applied over adding resistor 48 to junction 49 and there added to the saw-tooth potential $u_s$, as indicated in FIGURE 3 in the upper row at $u_{ü}$. The composite signal $u_{ü}$ is, as can be seen, larger than the potential at the intermediate positive bus 38, determined by the Zener diode 37 and, as has been mentioned, is connected to the emitter of transistor 63. Transistor 63 is therefore blocked, since its base is more positive than its emitter at all times. Thus, its collector has a potential of the negative bus 14 applied thereto, which is further applied through the coupling resistance 65 to the base of transistor 66 and thus blocks the transistor 66. Junction 68 thus has a potential applied thereto which is determined by the voltage division ratio of the voltage divider formed of resistances 69, 70 and which is sufficiently positive to fire the SCR's 20, 21 over the diode 73 and balancing resistors 74, 75, as soon as their anodes become positive. This is shown in FIGURE 3, in the second row, in the group of curves indicated at $a$, which further shows a potential $U_{G1}$ applied to the field winding 19. Both SCR's 20, 21 are thus fully conductive and a large field current results as indicated in FIGURE 3 in the lower row at $I_a$, which is the same current $I_{G1}$ indicated by the arrow in FIGURE 1. As the current through the field increases, the potential of generator 10 likewise will increase.

When the potential between buses 13, 14 has reached its nominal value, the voltage of 7.5 volts will be available at tap 33. This voltage will be positive with respect to the negative bus 15, and transistor 34 will no longer be fully conductive, so that its collector resistance 47 will have a potential of $u_{47}$ applied thereto, which may be, for example, 6.5 v. This potential is again added at junction 49 to the saw-tooth wave $u_s$ and applied to the base of transistor 63, as now shown in the group of curves under column $b$ in FIGURE 3. The composite potential $u_{ü}$ now is not larger, at any instance of time, than the potential of the intermediate positive bus 38; in a period of time between points $t_1$ and $t_2$ (FIGURE 3) it is more negative than the emitter potential of transistor 63, so that in this period of time transistor 63 will be conductive. Thus, its collector potential will be positive with respect to the potential of the negative bus 14, and transistor 66 will become conductive since its base will be more positive than its emitter. As transistor 66 becomes conductive, it acts as a short circuit for resistance 70 of the potential divider 69, 70 so that the junction point 68 is practically at the same potential as the negative bus 14. The control electrodes of SCR's 20, 21 thus do not have the positive potential applied in the period of time between $t_1$ and $t_2$, and thus remain blocked. When the composite potential $u_{ü}$ increases above that of the intermediate positive line 38, that is, when coincidence between the potential at intermediate line 38 and the composite signal occurs, as seen by the intersection of the horizontal line $u_z$ with the combined composite signal in full line in FIGURE 3, top row, transistor 63, and by it transistor 66, are again blocked, and SCR's 20, 21 permitted to have positive potential applied to their control electrodes. As soon as positive potential is applied to their control electrodes, they become conductive because now a positive potential is on their anodes as well.

The second row, column b of FIGURE 3 indicates this relationship. Phase S is utilized only to a minor extent, while phase T, that is the phase connected to SCR 21, is completely utilized. The excitation current $I_{G1}$ through the field coil 19 decreases as seen in the lower row of FIGURE 3, column b. This current is shown in an idealized form as if the bypass diode 24 were omitted, which permits some excitation current to flow in the intervals.

As the potential between buses 13, 14 further increases, the relationship shown in column c of FIGURE 3 will obtain. Let it be assumed that the increase is sufficient so that tap 33 has a potential of +7.9 volts with respect to the negative bus 14. The base of transistor 34 will now have a potential applied thereto which is only slightly less than that of the emitter potential of this transistor, and a very small collector current will result. The potential at the collector resistance 47 will fall to, for example, 5 v. This potential is added at adding point 49 to the saw-tooth wave $u_s$; the potential on the base of transistor 63 now, in the period of time $t_3$ to $t_4$ is now more negative than the emitter potential, so that the transistor and with it transistor 66 becomes conductive. Thus, SCR's 20, 21 remain blocked in the period of time from $t_3$ to $t_4$, because a short circuit exists across resistor 70. Phase S will not be utilized at all any more and SCR 21 will be utilized only during a portion of the positive half wave applied thereto. The current through the field $I_{G1}$ is thus quite small as seen in the last row of FIGURE 3 under column c.

If the potential between buses 13, 14 increases to the extent that the potential at tap 33 is identical to that of the Zener diode 37, that is 8 volts in the present example, transistor 34 will block completely, the potential at collector resistance 47 will be reduced to 0 and transistors 63 and 66 will be conductive at all times. SCR's 20, 21 will then be blocked completely.

The regulator, as described, can thus control simultaneously a pair of controlled rectifiers 20, 21 by controlling the phase-angle of their firing point. Thus, the number of the elements to be used becomes small, requiring little space and enabling low production costs.

Figure 4:
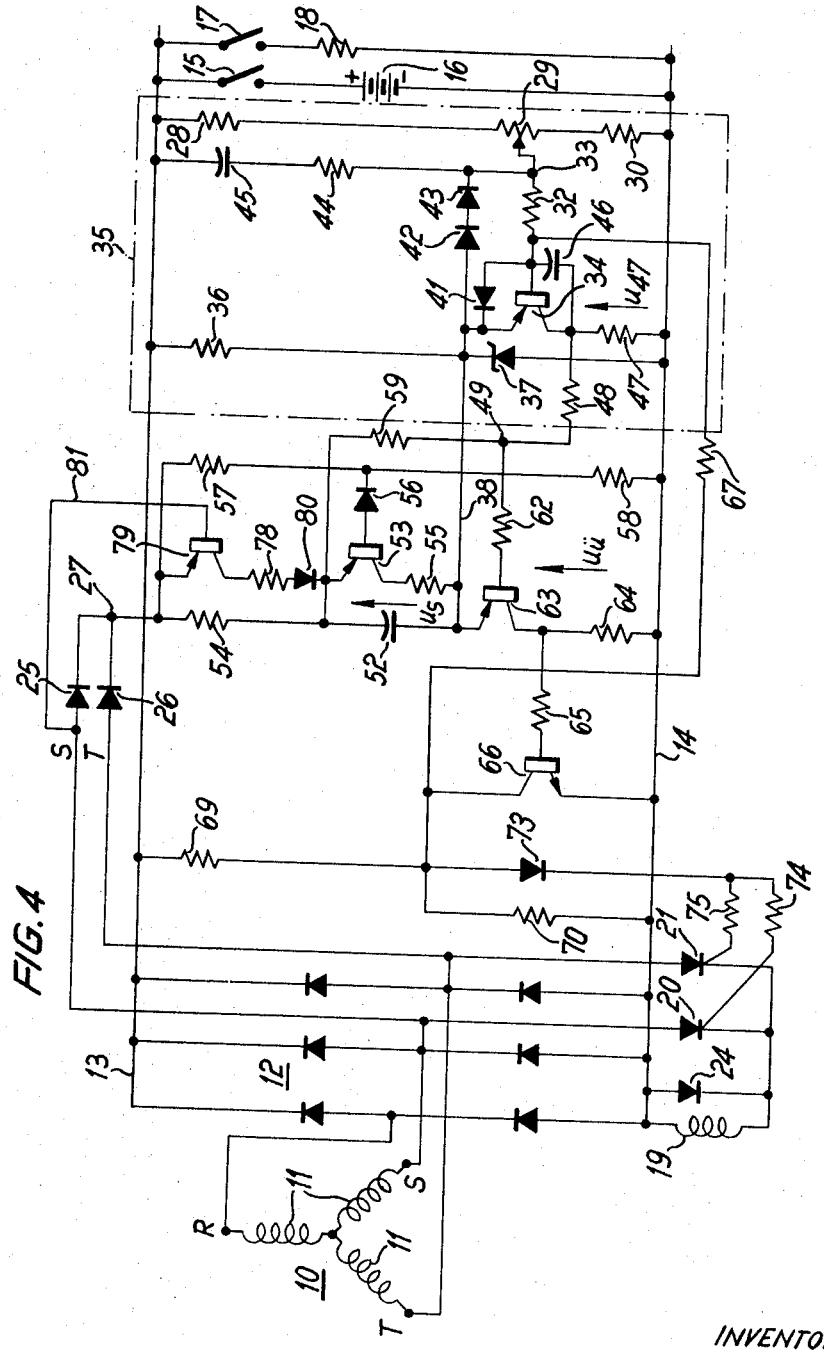
FIGURE 4 is a diagram of a regulator according to FIGURE 1 having a separate arrangement to vary the saw-tooth wave voltage in a particular portion during any one cycle.

The rectified potential obtained from a three-phase full-wave rectifier has a good deal of ripple. It is desirable, particularly when there is no load connected to the generator, to have a potential which is as constant as possible. The circuit of FIGURE 4, containing an additional control element provides this feature. The circuit according to FIGURE 4 is, in all essential respects, similar to that of FIGURE 1 and similar parts have similar reference numerals which will not be described again. The comparator 35 is identical to the comparator 35 of FIGURE 1 and most of the reference numbers in this figure have been omitted for clarity; reference is had to FIGURE 1 for a detailed showing.

Parallel to the load resistor 54 of the saw-tooth wave generator transistor 53 is a second resistance 78, arranged in series with the emitter-collector path of the p-n-p transistor 79 serving as a phase-dependent switch. A protecting diode 80 is further provided, connected as shown. The emitter of transistor 79 is connected to junction 27; it is connected over the second resistance 78 to the anode of diode 80, the cathode of which is connected to the emitter of the transistor 53. The base of transistor 79 is connected over a line 81 directly with the winding of the phase S of generator 10.

Figure 6:
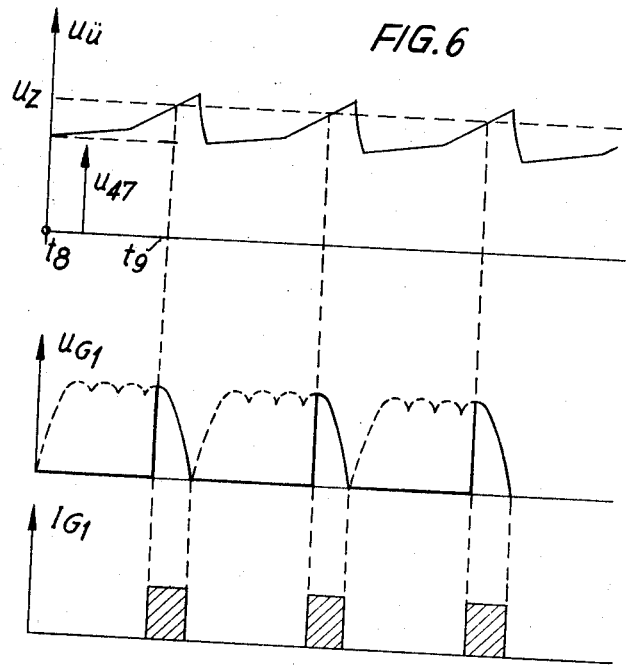

Let it be assumed that buses 13, 14 in the circuit of FIGURE 4 have the desired value of 12 volts. The saw-tooth wave generator, with condenser 52 and transistors 53 and 79 then operates as follows. At the start of the cycle, condenser 52 is discharged and the potential $u_1$ begins to rise to a positive value at time $t_5$, as seen in the upper row of FIGURE 5. Both transistors 53 and 79 are blocked; transistor 53 is blocked since its emitter, which is at the potential of condenser 52, is more negative than its base which is at the junction of the voltage divider formed by resistances 57, 58. Transistor 79 is blocked, since the rectified potential $u_1$, on its emitter, is not positive in respect to the potential of the phase S applied to its base. Condenser 52, is thus, for the time being charged only over the load resistance 54, until it reaches the point $t_6$ in FIGURE 5. At this point the potential of the base of the transistor 79 becomes negative with respect to the rectified potential $u_1$ at its emitter; transistor 79 becomes conductive and the second resistance 78 is now in parallel with the load resistance 54. This increases the load current to the condenser 52, as seen by the increase in slope of the curve $u_s$ from the point of time $t_6$ in the second row of FIGURE 5. At the period of time $t_7$ the potential on condenser 52 will become larger than the potential at the base of transistor 53; this transistor becomes conductive and the condenser 52 discharges, as described before, over the collector resistance 55. FIGURE 6 illustrates 3 diagrams, similar to the situation in column c of FIGURE 3, when the load 18 is disconnected, and the generator is not supplying substantial load current. In this instance, the potential between buses 13 and 14 may be somewhat above the desired normal value. Transistor 34 of the comparator 35 is only very little conductive and its collector resistance 47 has only a very small potential $u_{47}$ thereacross, which is applied to junction 49 over the adding resistance 48, there to be added to the saw-tooth wave potential $u_s$. The composite potential $u_{ii}$ is, during a large part of the increase of the saw-tooth wave $u_s$ more negative than the potential at the emitter of the transistor 63. This point of time is seen in FIGURE 6, in the upper row, and indicated at $t_8$, until point of time $t_9$. In this period of time, transistor 63, and with it transistor 66 are conductive and the resistance 70 of the voltage divider formed by resistances 69, 70 is short circuited so that application of firing potential to SCR's 20, 21 is inhibited. Thus, the SCR's 20, 21 are blocked. At point $t_9$, the base of transistor 63 becomes more positive than its emitter, so that transistor 63, and with it transistor 66 become blocked, and SCR's 20, 21 can receive a positive firing potential at their control electrodes. SCR 20, however, does not have a positive potential applied thereto at this time, and thus cannot fire, and only the SCR 21 can fire as seen in the lower row of FIGURE 6. As before, and to make the diagram more graphic, the relationship of the currents is indicated for the condition in which the bypass diode 24 is omitted. As can be seen clearly from the upper row of FIGURE 6, variations of the potential $u_{47}$ on the collector resistance 47 of transistor 34 do not affect time of firing $t_9$ as much as in the circuit of FIGURE 1, since the angle of intersection of the curve of the saw-tooth wave $u_s$ with the horizontal $u_z$ is much larger as in the diagram of FIGURE 3, columns b and c, illustrating the action of the circuit according to FIGURE 1. Thus, in the arrangement according to FIGURE 4, variations of the no-load potential have a much lesser influence on the time of firing of the SCR's as in the circuit of FIGURE 1. This is particularly advantageous with generators which can be expected to run without substantial loading for an appreciable period of time.

Feed-back resistance 67, shown in FIGURES 1 and 4, operates in a similar manner in both circuits. It is effective to stabilize the regulator. When the potential of the base of transistor 34 becomes more positive, so that the SCR's 20, 21 remain blocked longer, the collector potential of transistor 66 becomes more negative and counteracts the change of potential on the base of transistor 34, thus acting as a negative feedback for general stabilization.

The regulator according to either FIGURES 1 or 4 is simple to construct. This simplicity is primarily achieved by constantly supplying the control electrodes of SCR's 20, 21 with a positive control potential which acts to cause the SCR's 20, 21 to normally conduct, and to suppress this positive potential, for such periods of time, during which the SCR's 20, 21 should be blocked. Transistor 66, when conductive, causes this disabling function by short circuiting resistance 70. This arrangement, in connection with the saw-tooth wave generator enables a simple construction of the regulator and to control controlled rectifiers connected to two different phases of a multiphase network by controlling the phase of their firing angle. Speed variations, which in automotive engines may vary in a range of from twenty to one, and consequent changes of frequency have little effect on the efficiency of operation of the regulator.

I claim:

1. In a voltage regulator for a multiphase, variable-speed, variable-frequency generator (10) having a field winding (19), said regulator having a controlled rectifier (20, 21) connected to supply current ($I_{G1}$) to said field coil (19) derived from said generator; and a comparator (35) connected to sense deviation of output potential of said generator from a norm and supplying an error signal ($u_{47}$) indicative of variation of said output potential, the improvement comprising:

a saw-tooth wave generator (52, 53) connected to the output of at least one phase of said generator (S, T) and generating a saw-tooth wave ($u_s$) in synchronism with the frequency of said generator (10);

an adder circuit (48, 59, 62) adding the error signal ($u_{47}$) to said saw-tooth wave to obtain a composite signal ($u_{ü}$);

and a firing control circuit including a controlled switch (63) connected to said controlled rectifier (20, 21) and energized by said composite signal and controlling the on-time of said controlled rectifier within any cycle of said generator in accordance with the combined magnitude of said error signal and said saw-tooth wave.

2. Regulator as claimed in claim 1, wherein the controlled switch of said firing circuit is a transistor (63) having its output circuit (65, 66) connected to said controlled rectifier (20, 21).

3. Regulator as claimed in claim 2, wherein the output circuit of said controlled switch (63) includes a phase-inversion circuit (66).

4. Regulator as claimed in claim 1, wherein the firing circuit (74, 75) of the controlled rectifier (20, 21) is connected (73, 69, 13) to the output circuit of said generator, and said controlled switch (63) is in parallel (70, 66) to said firing circuit and short circuits said firing circuit during the off-time when said controlled rectifier (20, 21) should not conduct, as determined by the magnitude of said composite signal ($u_{ü}$).

5. Regulator as claimed in claim 1, including a negative feedback circuit (67) interconnecting the firing circuit of the controlled rectifier (20, 21) and the comparator (35).

6. Regulator as claimed in claim 1, wherein the comparator (35) includes a transistor (34), a source of reference potential (37—$u_z$), the reference potential being connected across the emitter-collector circuit of said transistor (34) and the base being connected (32, 33) to a potential proportional (28, 29, 30) to the output potential of the generator.

7. Regulator as claimed in claim 1, wherein the firing circuit includes a controlled transistor (63) having said composite signal ($u_{ü}$) applied thereto, and a source of reference potential ($u_z$—37), and means supplying operating potential to said control transistor (63) from said source (37) of reference potential.

8. Regulator as claimed in claim 7 wherein said source of reference potential (37) is connected to the output of said generator and also supplies the reference potential for said comparator (35) and establishes the norm against which the generator output potential is compared.

9. Regulator as claimed in claim 1, including a source of reference potential (37—$u_z$); said saw-tooth wave generator (52, 53) being connected to said source of reference potential (37) and means including rectifiers (25, 26) connected to at least one less phase than the number of phases of said multiphase generator supplying operating potential to said saw-tooth wave generator.

10. Regulator as claimed in claim 9, wherein said source of reference potential (37) is connected to the output of the generator and also supplies the reference potential for said comparator (35); said generator is a three-phase generator; a separate diode (25, 26) each is provided, connected to one of two phases of the generator on one side, in parallel on the other to form a junction (27) so that said junction will have a pulsating voltage applied thereto; and the saw-tooth wave generator is connected to said junction (27) on the one hand and to said reference potential (37) on the other to provide a saw-tooth wave in synchronism with the frequency of said generator.

11. Regulator as claimed in claim 1 including means (25, 26) connected to said generator (10) delivering a pulsating voltage (27) therefrom, said saw-tooth wave generator (52, 53) including a condenser (52); and a transistor (53) having its emitter-collector circuit connected in parallel with said condenser (52) and its base connected over a voltage-divider (57, 58) to said pulsating voltage.

12. Regulator as claimed in claim 11, wherein the means connected to said generator delivering a pulsating voltage (25, 26, 27) includes a plurality of rectifiers (25, 26) connected on one side to adjacent phases of said multiphase generator and on the other to a common junction (27); and a like plurality of controlled rectifiers (20, 21) are provided having their power terminals connected to the same phases of said generator as said rectifiers (25, 26) on one side; and to the field coil of said generator on the other.

13. Regulator as claimed in claim 11, including a load resistor connected between the means delivering the pulsating voltage (27) and said condenser (52); an additional resistance (78) and a phase-sensitive control switch (79), serially connected, in parallel with said load resistor (54); and means controlling said phase-sensitive switch from one of the phases of said multiphase generator to become conductive at a predetermined period of time within each cycle of the generator and place said additional resistance (78) in parallel to said load resistance (54).

14. Regulator as claimed in claim 12, including a load resistance (54) interconnecting said common junction (27) and said condenser (52); a series circuit comprising a resistance (78) and the emitter-collector path of a transistor (79) connected in parallel with said load resistance (54); and means controlling said last named transistor (79) to become conductive when the potential of the junction (27) has reached a predetermined level with respect to the potential of an earlier one of said adjacent phases.

15. Regulator as claimed in claim 1, wherein said generator is a three-phase generator, a pair of controlled rectifiers (20, 21) are provided connected to two of the three phases (S, T) of the generator respectively; means connected to the output of said generator providing a firing potential for said controlled rectifiers (20, 21), said regulator providing a common control for both said rectifiers (20, 21) by inhibiting application of said firing potential to said controlled rectifiers (20, 21) in synchronism with the frequency of the generator (10) and for a time duration depending on the output potential of the generator (10).

16. Regulator as claimed in claim 1 including a source of reference potential (37—$u_z$); said firing circuit being differentially connected to the reference potential ($u_z$) and the composite signal ($u_{ü}$) to compare said reference potential ($u_z$) and said composite signal ($u_{ü}$) varying with said saw-tooth wave shape, said controlled switch (63) changing state to enable said controlled rectifier (20, 21) when the composite signal ($u_ü$) varying with said saw-tooth wave shape, reaches coincidence with said reference potential ($u_z$) during any cycle of the generator, whereby the phasing of the firing of the controlled rectifier (20, 21) supplying field current ($I_{G1}$) will be determined by the value of the error signal ($u_{47}$) and the cyclical repetition rate of firing will be determined by the frequency of the saw-tooth wave ($u_s$) generated in synchronism with the frequency of the generator.

17. Voltage regulator as claimed in claim 1 in combination with an automobile three-phase generator; a storage battery; and a rectifier network rectifying the output of said generator and interconnecting said generator output to said battery; said regulator being connected across said battery and to said generator.

18. In a voltage regulator for a three-phase generator (10) having a field coil (19); a pair of controlled rectifiers (20, 21) supplying said field coil (19) with current and connected to said generator (10); the improvement comprising:
  a saw-tooth wave generator (52, 53) generating a saw-tooth wave in synchronism with the frequency of said generator (10) and providing a gradually varying potential during substantially a complete cycle of the generator; means (35) deriving an error signal ($u_{47}$) determinative of deviation of the input voltage (13, 14) to the regulator from said generator (10) from a desired level; means (48, 59, 49) adding said saw-tooth wave ($u_s$) and said error signal ($u_{47}$) to obtain a composite signal ($u_ü$) having a deviation component ($u_{47}$) and a time varying ($u_s$) component; means comparing (63, 38, 64) said composite signal ($u_ü$) with a reference ($u_z$); and means delivering firing potential (69, 73; 65, 66, 70) to both said controlled rectifiers (20, 21) at the time during a cycle of the generator when coincidence of said composite signal ($u_ü$) and said reference ($u_z$) occurs.

References Cited
UNITED STATES PATENTS 3,225,284 12/1965 Kawai et al. _____ 322—28
3,231,757 1/1966 Rainer et al. _____ 322—28 X ORIS L. RADER, *Primary Examiner.*

H. HUBERFELD, *Assistant Examiner.*

U.S. Cl. X.R.

322—28, 32, 73